Sept. 13, 1927. 1,642,521
W. J. VERITY ET AL
POWER LIFT FOR PLOWS
Filed April 17, 1926 2 Sheets-Sheet 1
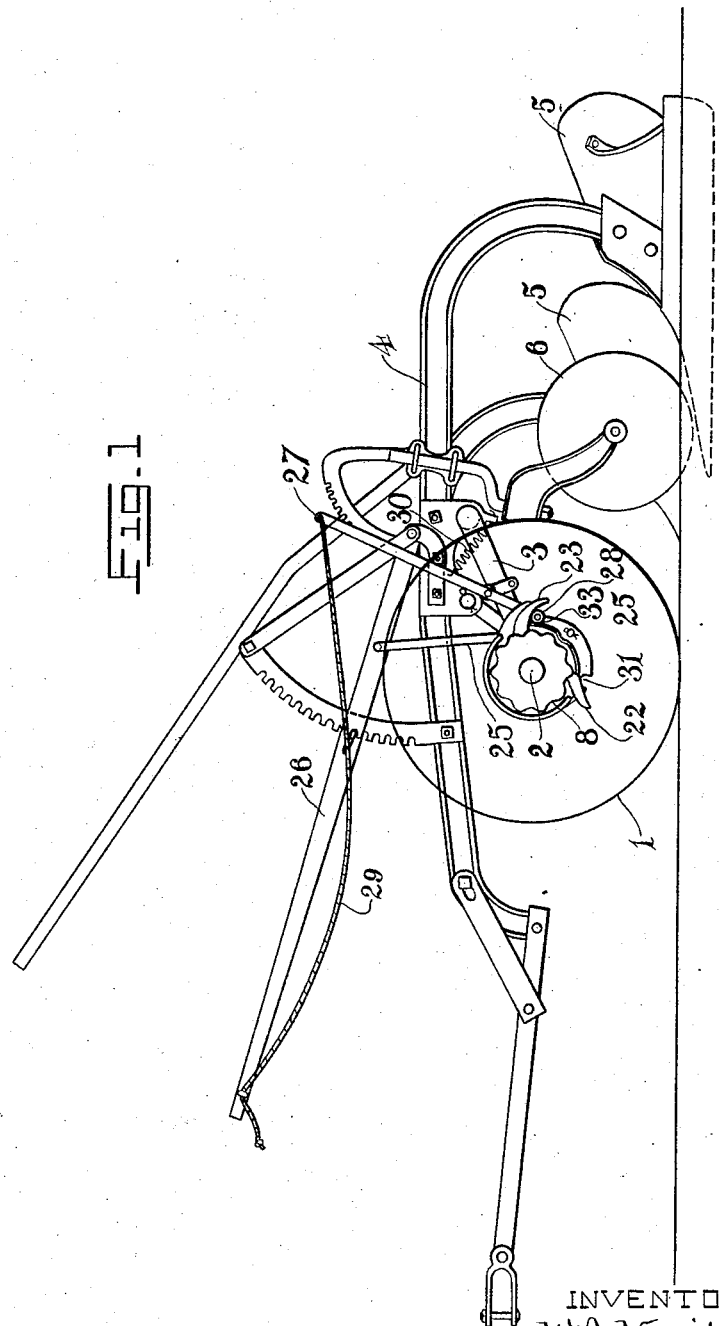
INVENTORS.
W. J. Verity.
P. A. Van Sickle
BY J. Edward Maybee
ATTY.

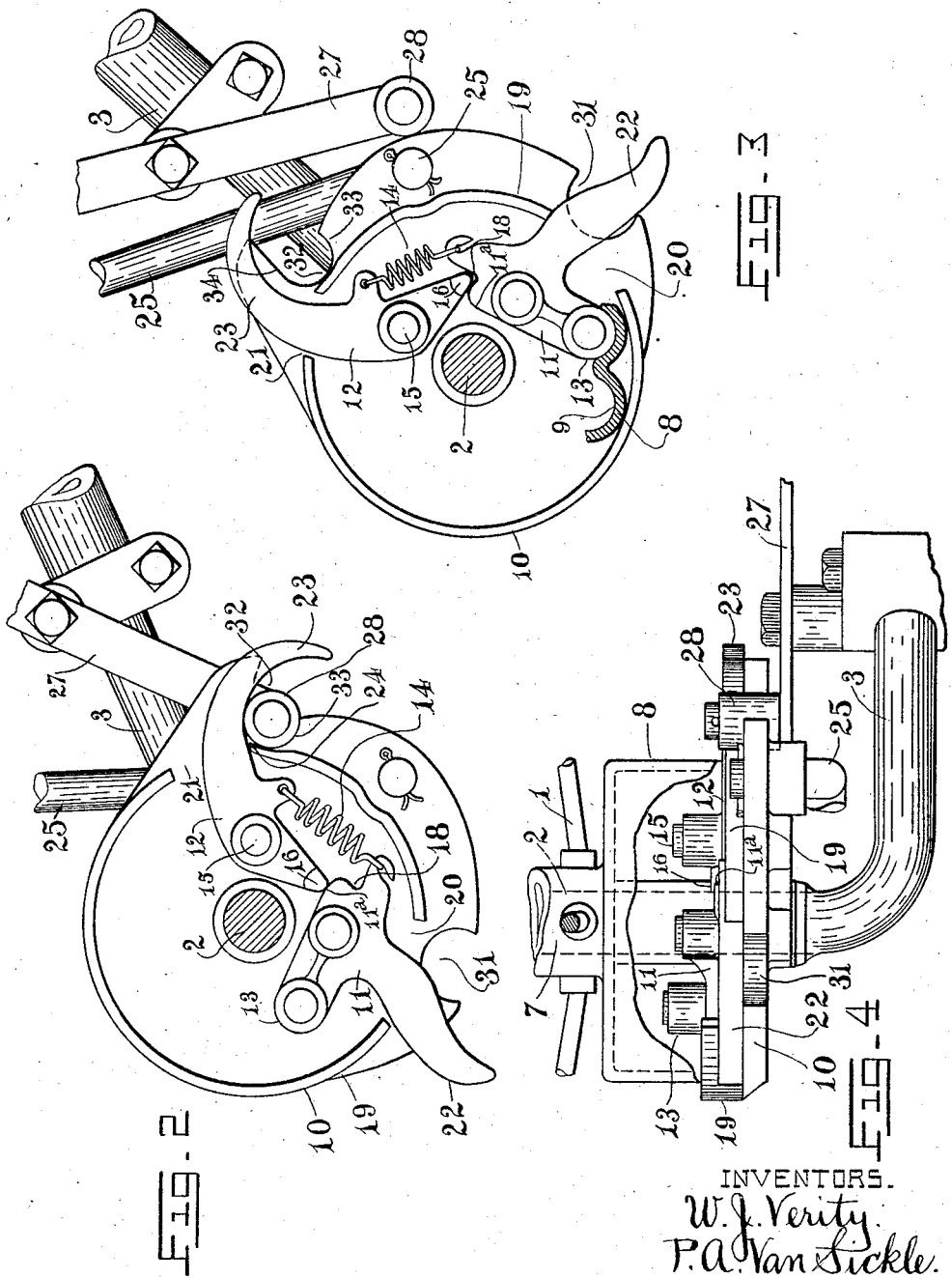

Patented Sept. 13, 1927.

1,642,521

UNITED STATES PATENT OFFICE.

WILLIAM JOHN VERITY AND PAUL ABRAHAM VAN SICKLE, OF BRANTFORD, ONTARIO, CANADA, ASSIGNORS TO MASSEY-HARRIS COMPANY, LIMITED, OF TORONTO, CANADA.

POWER LIFT FOR PLOWS.

Application filed April 17, 1926. Serial No. 102,689.

This invention relates to plow lifts for plows and more particularly to plow lifts for that type of plow commonly called "frameless" in which no frame is provided other than the plow beam, and our object is to provide a power lift which is simple in design, cheap to manufacture and which may be readily assembled and yet be durable and efficient. Heretofore the power lifts used on "frameless" plows were of a type which permitted the land wheel axle to "float" and depended solely on the "suction" or "dip" of the bottoms to hold them in their working position in the ground. Another object is to so construct our power lift that it will overcome the above objectionable "floating" feature of the land wheel axle by releasably locking the relatively movable parts of the "frameless" type of plow to form a "rigid" plow when set in its working position.

We attain our objects by providing a land wheel of the plow with a notched drum adapted to be clutched with the power lift which is freely mounted on the axle of the said land wheel. The plow bottoms are secured to a beam which is connected by means of a rod with the power lift, and by means of a crank with the land wheel. Manually controlled means is provided for rocking a pivoted trigger to operate clutching mechanism which causes a carrier to be revolved with the land wheel until the said means engages an arm on the clutching mechanism to declutch the power lift. During this partial revolution of the carrier the connecting rod raises the plow beam and thus the plow bottoms are raised clear of the ground. A roller of the manually controlled means that engages the arm is pulled by a string into a recess in the periphery of the carrier which releasably locks the power lift and thus the plow bottoms in their raised position.

The plow bottoms are lowered by means of gravity into the ground when the manually controlled means are again operated to remove the roller thereof from the recess. The carrier is provided with a notch adjacent the trigger and this notch is adapted to receive the said roller to limit the downward movement of the plow beam and retain it in this position until the manually controlled means is again operated.

The constructions are hereinafter more fully described and illustrated in the accompanying drawings in which—

Fig. 1 is a side elevation of a "frameless" plow having our improvements thereon;

Fig. 2 a cross section, on an enlarged scale, through the land wheel axle showing the parts in the position they occupy when the plow is in operation;

Fig. 3 a view similar to Fig 2 showing the power lift in operation to raise the plow; and Fig. 4 an underside plan view of Fig. 2.

In the drawings like numerals of reference indicate corresponding parts in the different figures.

1 is the land wheel of the plow and this wheel is journalled on an axle 2 formed on the crank arm 3 which is pivoted on a beam 4. The beam carries the plow bottoms 5 and disc cutters 6, and is adapted to be connected with a draw bar of a tractor. The plow also includes a furrow wheel carried on a cranked axle which is adjusted in the ordinary manner, these parts not being shown. This type of plow, in which there is no second frame for carrying the drawbar attachments and for carrying the plow frame or beam, is commonly termed "frameless".

The hub 7 of the land wheel 1 carries a drum 8 having notches 9 formed in its inner periphery. On the axle 2 is freely mounted a carrier 10 on which a pawl 11 and a trigger 12 are pivoted. The pawl is provided with a laterally extending projection 13 including an anti-friction roller adapted to be received in the notches 9. A spring 14 having one end connected with the pawl and the other end connected with the trigger 12 tends to rock the pawl to clutch the projection with the drum when the trigger is rocked on its pivot 15. The trigger is provided with a nose 16 adapted to engage the side of an extension 11$^a$ formed on the pawl to position the projection out of engagement with the drum and the spring normally tends to rock the trigger to its position for holding the projection in its inoperative or declutched position. The extension 11$^a$ is formed with a recess 18 adapted, when the trigger is released, to be engaged by the nose 16 to limit the movement of the projection towards its clutching position.

The carrier is provided with an annular rib 19 adapted to overlie the inner portion of the drum 8. The rib has openings 20 and 21 therein for the passage of an arm 22 and a curved end 23 formed on the pawl and the trigger respectively. The end 23 engages a shoulder 24 on the rib 19 to limit the inward swing of the trigger. A connecting rod 25 is pivotally connected with the carrier eccentric to its axis and with a hand lever 26 adjustably carried in any suitable manner on the beam 4.

From the above description it is obvious that by rocking the trigger to release the pawl the projection thereon will be clutched with the drum whereby the carrier will be rotated therewith to raise the beam and the plow bottoms relative to the ground. This movement of the trigger is accomplished by a lever 27 pivoted on the crank arm 3 and provided with a roller 28 at one end and a cord 29 at the other end. A spring 30 connected with the lever and a suitable stationary part tends to maintain the roller in engagement with the periphery of the carrier 10. The roller is adapted to be received either in a recess 31 or in a notch 32 formed in the periphery of the carrier and respectively located adjacent the arm 22 on the pawl and the curved end 23 of the trigger. Referring to Figs. 2 and 3 it will be noted that the notch 32 is substantially semi-circular in shape to form two shoulders 33 and 34 adapted to engage the opposite sides of the roller 28 to limit any relative rotary movement in either direction between the roller and the carrier. It will also be noted that the curved end 23 is spaced relative to the notch 32 and the shoulder 33 to provide just sufficient clearance for the roller to ride over the shoulder 33 and into the notch.

Assuming the plow bottoms 5 are in their cutting position as shown in Fig. 1 and the roller 28 is positioned in the notch 32, the mode of operation is as follows. When it is desired to raise the plow bottoms, the operator pulls the cord 29 which causes the roller 28 on the lower end of the lever 27 to swing out of the notch and at the same time engage the curved end 23 of the trigger to rock the latter and swing its nose 16 out of engagement with the side of the extension 11ª. This permits the spring 14 to rock the pawl 11 to clutch the projection 13 with the notched drum 8 which causes the carrier 10 to rotate with the latter. The spring 30 maintains the roller 28 in engagement with the periphery of the carrier during its rotary movement and when the arm 22 strikes the roller the pawl is rocked on its pivot to swing the projection 13 out of engagement with the drum. The spring 30 forces the roller into the recess 31 which retains the plow in its raised position. The rocking of the pawl by its engagement with the roller also permits the spring 14 to draw the trigger to its position for holding the pawl with its projection 13 out of engagement with the drum.

The plow bottoms may be adjusted by means of the lever 26 to cut any desired depth of furrow. When it is desired to lower the plows into the ground the cord is again pulled to move the roller 28 out of the recess 31 which permits the plow beam and plow bottoms to fall by gravity thus rotating the carrier in a reverse direction to the direction of rotation of the wheel 1 until the notch 32 again receives the roller 28. The pawl and trigger are thus in position to be actuated when it is desired to raise the plow again.

As hereinbefore mentioned, the roller 28 when positioned in the notch 32 is engaged by the shoulder 33 which locks the crank 3 relative to the beam 4 and prevents the plow bottoms from "floating" relative to the land wheel. With this arrangement the depth of the furrow does not vary if the land wheel drops into a depression.

It will be noted that the curved end of the trigger is so shaped and so positioned relative to the notch that the roller will pass into the notch when the carrier rotates to lower the plow bottom, and when in the notch the roller is positioned to engage the curved end of the trigger without appreciable lost motion.

What we claim is:

1. In a power lift for plows, the combination with an axle; a land wheel journalled thereon, of a pawl and trigger carrier freely mounted on the axle; a drum secured to the land wheel; a pawl pivoted on the said carrier and provided with a projection adapted to be clutched with the drum; a trigger pivoted on the said carrier and adapted to engage the pawl to position the projection out of engagement with the drum; spring means tending to rock the trigger to draw it to its position for holding the pawl with its projection out of engagement with the drum and tending to rock the pawl to clutch the projection with the drum; and means for rocking the trigger on its pivot.

2. In a power lift for plows, the combination with an axle; a land wheel journalled thereon, of a pawl and trigger carrier freely mounted on the axle; a drum secured to the land wheel; a pawl pivoted on the said carrier and provided with a projection adapted to be clutched with the drum; a trigger pivoted on the said carrier and adapted to engage the pawl to position the projection out of engagement with the drum; spring means tending to rock the trigger to draw it to its position for holding the pawl with its projection out of engagement with the drum and tending to rock the pawl to clutch the projection with the drum, the trigger having an outer end; and means including a lever having a roller adapted to engage the said end to rock the trigger, the periphery of the carrier having a notch located adjacent the said end to receive the roller and adapted to retain it therein until manually released.

3. In a power lift for plows, the combination with an axle; a land wheel journalled thereon, of a pawl and trigger carrier freely mounted on the axle; a drum secured to the land wheel; a pawl pivoted on the said carrier and provided with a projection adapted to be clutched with the drum; an extension formed on the pawl and having a recess formed in its end; a trigger pivoted on the said carrier and provided with a nose adapted to engage one side of the extension to hold the projection out of engagement with the drum and adapted to engage in the recess to limit the movement of the projection towards its clutching position; spring means tending to rock the trigger to draw it to its position for holding the pawl with its projection out of engagement with the drum and tending to rock the pawl to clutch the projection with the drum; and means for rocking the trigger.

4. In a plow, the combination with an axle; a land wheel journalled thereon, of power lifting means including a pawl and trigger carrier freely mounted on the axle; a drum secured to the land wheel; a pawl pivoted on the said carrier and provided with a projection adapted to be clutched with the drum; a trigger pivoted on the said carrier and adapted to engage the pawl to position the projection out of engagement with the drum; spring means tending to rock the trigger to draw it to its position for holding the pawl with its projection out of engagement with the drum and tending to rock the pawl to clutch the projection with the drum; means for rocking the trigger on its pivot; and means for preventing an accidental relative movement between the trigger rocking means and the carrier under working conditions of the plow whereby the plow bottom will be held in fixed relationship to the land wheel.

5. In a power lift for plows, the combination with an axle; a land wheel journalled thereon, of a pawl and trigger carrier freely mounted on the axle; a drum secured to the land wheel; a pawl pivoted on the said carrier and provided with a projection adapted to be clutched with the drum; a trigger pivoted on the said carrier to engage the pawl to position the projection out of clutching engagement with the drum; means for rocking the trigger on its pivot to permit the projection to move into clutching engagement with the drum; and means for preventing an accidental relative movement between the trigger and the trigger rocking means while the plow is working whereby the plow bottom will be held in fixed relationship to the land wheel.

6. In a plow the combination with an axle; a land wheel journalled thereon; of power lifting means including a pawl and trigger carrier freely mounted on the axle and having a notch formed in its periphery.; a drum secured to the land wheel; a pawl pivoted on said carrier and provided with a projection adapted to be clutched with the drum; a trigger pivoted on the carrier normally tending to hold the pawl out of clutch with the drum and provided with a curved end adjacent the notch aforesaid; a trigger actuating lever carrying a projection adapted to pass between the carrier and the curved end of the trigger into the notch when the carrier is rotated by the lowering of the plow to working position, the said end being shaped to be engaged by the projection without appreciable lost motion when the lever is rocked to actuate the trigger.

7. In a power lift for plows, the combination with an axle; a land wheel journalled thereon, of a pawl and trigger carrier freely mounted on the axle; a drum secured to the land wheel; a pawl pivoted on the said carrier and provided with a projection adapted to be clutched with the drum; a trigger pivoted on the said carrier and adapted to engage the pawl to position the projection out of engagement with the drum; a spring having one end connected with the trigger and having the other end connected with the pawl to tend to throw the projection into clutching engagement with the drum; and means for rocking the trigger on its pivot.

8. In a power lift for plows, the combination with an axle; a land wheel journalled thereon, of a pawl and trigger carrier freely mounted on the axle; a drum secured to the land wheel; a pawl pivoted on the said carrier and provided with a projection adapted to be clutched with the drum; a trigger pivoted on the said carrier and adapted to engage the pawl to position the projection out of engagement with the drum; a spring connected with the trigger and the pawl tending to rock the trigger to draw it to its position for holding the pawl with its projection out of engagement with the drum and tending to rock the pawl to clutch the projection with the drum; and means for rocking the trigger on its pivot.

9. In a power lift for plows, the combination with an axle; a land wheel journalled thereon, of a pawl and trigger carrier freely mounted on the axle; a drum secured to the land wheel; a pawl pivoted on the said carrier and provided with a projection adapted to be clutched with the drum; an extension formed on the pawl and having a recess formed in its end; a trigger pivoted on the said carrier and provided with a nose adapted to engage one side of the extension to hold the projection out of engagement with the drum and adapted to engage in the recess to limit the movement of the projection towards its clutching position; a spring connected with the trigger and the pawl tending to rock the trigger to draw it to its position for holding the pawl with its projection out of engagement with the drum and tending to rock the pawl to clutch the projection with the drum, the trigger having an outer end; and means including a lever adapted to engage the said end to rock the trigger and permit the spring to rock the pawl to clutch the projection with the drum, the pawl being provided with an arm adapted to be engaged by the lever to rock the pawl projection out of engagement with the drum and permit the spring to rock the trigger nose into engagement with the side of the extension.

Signed at Brantford this 27th day of March 1926.

WILLIAM JOHN VERITY.
PAUL ABRAHAM VAN SICKLE.